(12) United States Patent
Rice et al.

(10) Patent No.: US 9,821,352 B2
(45) Date of Patent: Nov. 21, 2017

(54) ENGINE WASH APPARATUS AND METHOD

(75) Inventors: Robert M. Rice, Huntsville, AL (US); Kurt Dorshimer, Fayetteville, GA (US); Sebastian Nordlund, Solna (SE); Wayne Zadrick, Bristol, CT (US)

(73) Assignee: EcoServices, LLC, Wethersfield, CT (US)

( * ) Notice: Subject to any disclaimer, the term of this patent is extended or adjusted under 35 U.S.C. 154(b) by 1548 days.

(21) Appl. No.: 13/534,759

(22) Filed: Jun. 27, 2012

(65) Prior Publication Data
US 2014/0000717 A1 Jan. 2, 2014

(51) Int. Cl.
*B08B 3/02* (2006.01)
*B08B 17/02* (2006.01)
*B64F 5/30* (2017.01)

(52) U.S. Cl.
CPC .............. *B08B 17/025* (2013.01); *B64F 5/30* (2017.01); *Y10T 137/0318* (2015.04); *Y10T 137/5762* (2015.04)

(58) Field of Classification Search
CPC F01D 25/002; B08B 3/02; B08B 9/00; B08B 17/025; B64F 5/0018
USPC ........ 134/34, 104.2, 22.1, 10, 166 R, 169 A, 134/198, 22.18; 210/171, 241, 172.1, 210/248; 137/1, 312
See application file for complete search history.

(56) References Cited

U.S. PATENT DOCUMENTS

| | | | |
|---|---|---|---|
| 4,196,020 A | 4/1980 | Hornak et al. | |
| 5,899,217 A | 5/1999 | Testman, Jr. | |
| 6,630,198 B2 | 10/2003 | Ackerman et al. | |
| 6,766,980 B1 | 7/2004 | Greenston | |
| 7,445,677 B1* | 11/2008 | Asplund | B08B 3/02 134/134 |
| 8,197,609 B2* | 6/2012 | Alvestig | B08B 3/02 134/104.4 |
| 8,277,647 B2* | 10/2012 | Rice | B08B 17/00 134/10 |
| 2004/0149322 A1 | 8/2004 | Peng et al. | |
| 2006/0289037 A1 | 12/2006 | Shook | |
| 2008/0040872 A1 | 2/2008 | Hjerpe | |
| 2008/0041424 A1 | 2/2008 | Wick et al. | |
| 2008/0149141 A1* | 6/2008 | Sales | F01D 25/002 134/22.1 |

(Continued)

FOREIGN PATENT DOCUMENTS

| | | |
|---|---|---|
| EP | 0 933 144 A2 | 8/1999 |
| WO | WO 2008/025940 A1 | 3/2008 |

OTHER PUBLICATIONS

International Search Report and Written Opinion from PCT Application Serial No. PCT/US2013/048258; dated Oct. 4, 2013, 16 pages.

*Primary Examiner* — Michael Barr
*Assistant Examiner* — Thomas Bucci
(74) *Attorney, Agent, or Firm* — Westman, Champlin & Koehler, P.A.

(57) ABSTRACT

An engine wash system with a collector includes a collection pan with a base angled toward a centerline and first and second panels rotatably connecting to first and second sides of the collection pan; a plurality of wheels connecting to the base; a first support connecting on a lower end to the collection pan and extending vertically upward from the collection pan; a first funnel connecting to the first support; and a first hose connecting the first funnel to the collection pan.

15 Claims, 9 Drawing Sheets

(56) References Cited

U.S. PATENT DOCUMENTS

| | | |
|---|---|---|
| 2008/0272040 A1 | 11/2008 | Nordlund et al. |
| 2009/0159517 A1* | 6/2009 | Rice ................ B08B 17/00 210/171 |
| 2010/0051061 A1 | 3/2010 | Guillon |
| 2010/0242994 A1* | 9/2010 | Amcoff ............... B08B 3/00 134/10 |
| 2011/0186096 A1 | 8/2011 | Nordlund |
| 2011/0232697 A1 | 9/2011 | Amcoff et al. |
| 2012/0103375 A1 | 5/2012 | Alvestig et al. |

\* cited by examiner

ENGINE WASH APPARATUS AND METHOD

BACKGROUND

Through use, gas turbine engines become subject to buildup of contaminants on engine components. These contaminants can affect engine components and overall performance of the engine. Engine washing can help to remove these contaminants and improve engine performance and efficiency.

Conventional compressor washing can be done by introducing a fluid to the inlet of the engine, with the intention of it flowing through the compressor and removing contaminants therein. Conventional turbine wash processes are accomplished periodically by removing an igniter, installing a cleaning probe into an ignitor port and flushing out the igniter port with a wash fluid. After cleaning of the turbine is complete, the cleaning probe is removed and the igniter is reinstalled.

SUMMARY

An engine wash system includes a collector for collecting wash liquid from an engine washing operation. The collector includes a collection pan with a base angled toward a centerline and first and second panels rotatably connecting to first and second sides of the collection pan; a plurality of wheels connecting to the base; a first support connecting on a lower end to the collection pan and extending vertically upward from the collection pan; a first funnel connecting to the first support; and a first hose connecting the first funnel to the collection pan.

A method for collecting wash effluent from an engine washing operation includes providing a collector with a collection pan with rotatable panels connected to first and second sides of the pan and first and second funnels detachably connected to the collection pan; placing the collector relative to an aircraft so that the collection pan and panels are located beneath engine case outlets and the first and second funnels are located beneath engine exhaust outlets; and collecting wash effluent draining from the engine in the collector.

DETAILED DESCRIPTION

Figure 1A:
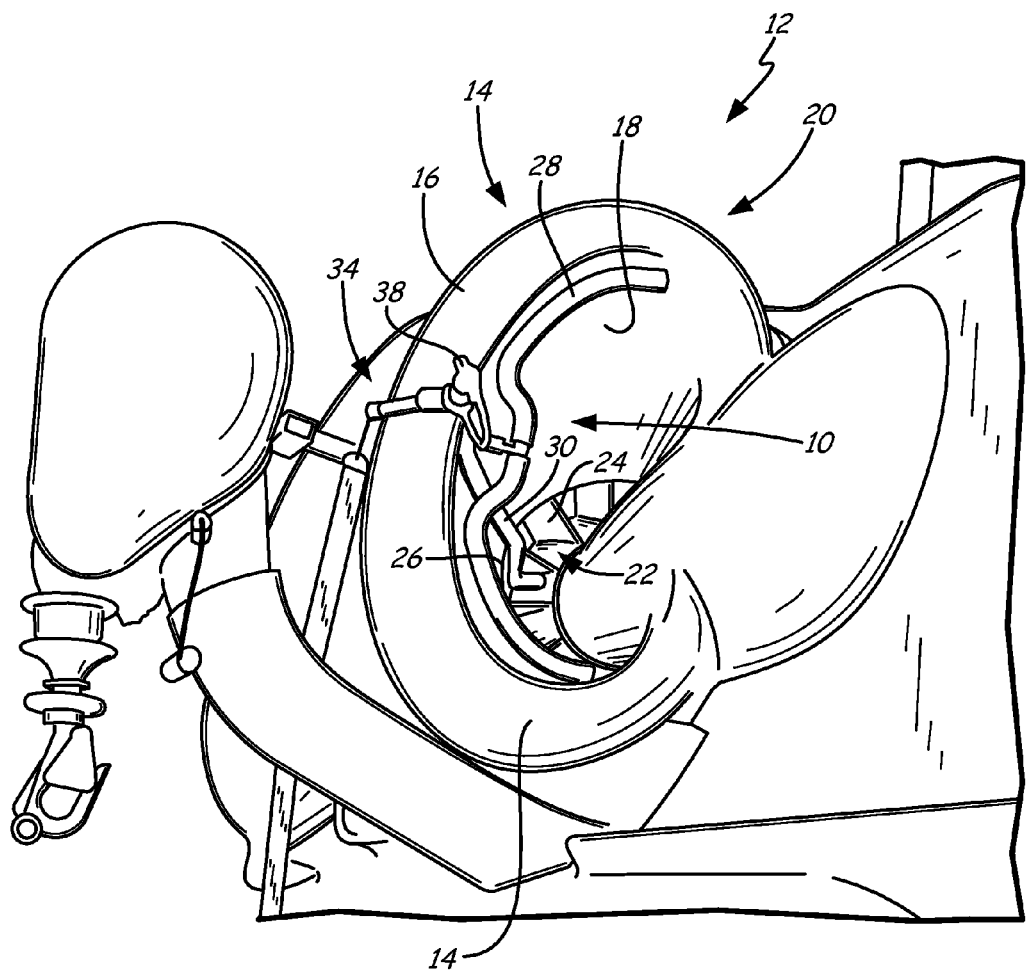
FIG. 1A shows a perspective view of an engine wash manifold connected to an engine.
Figure 1B:
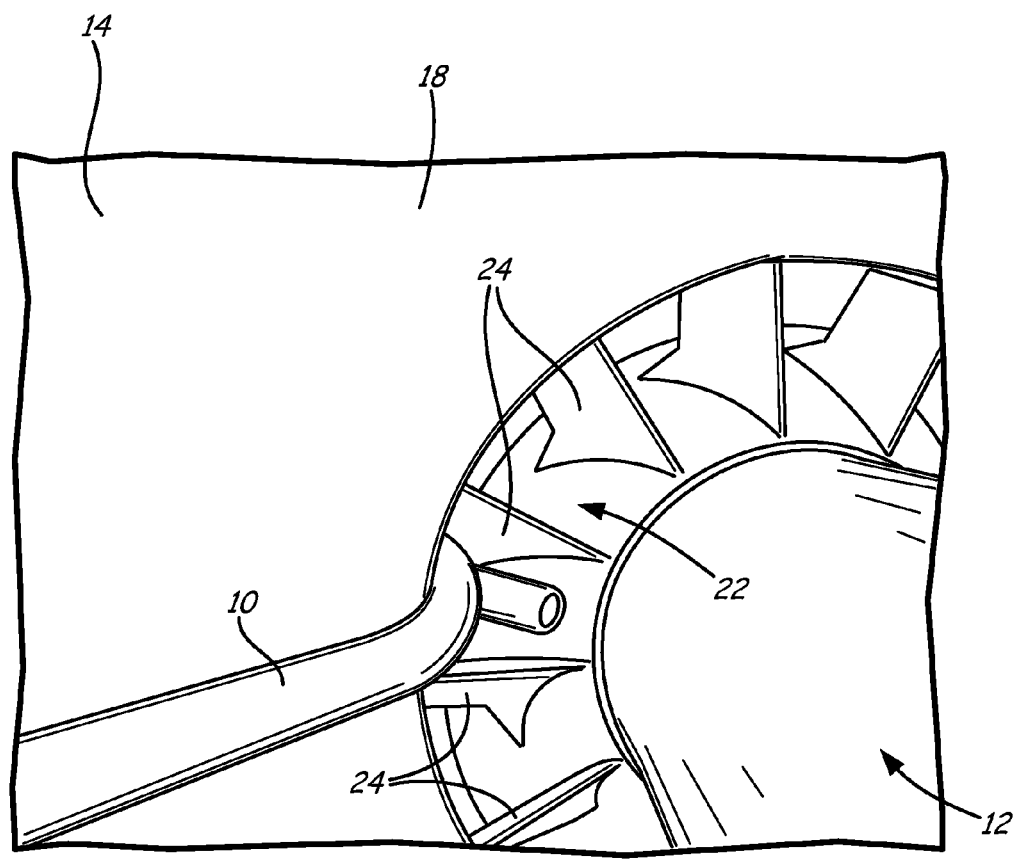
FIG. 1B shows a close up view of a portion of the engine wash manifold and engine of FIG. 1A.
Figure 1C:
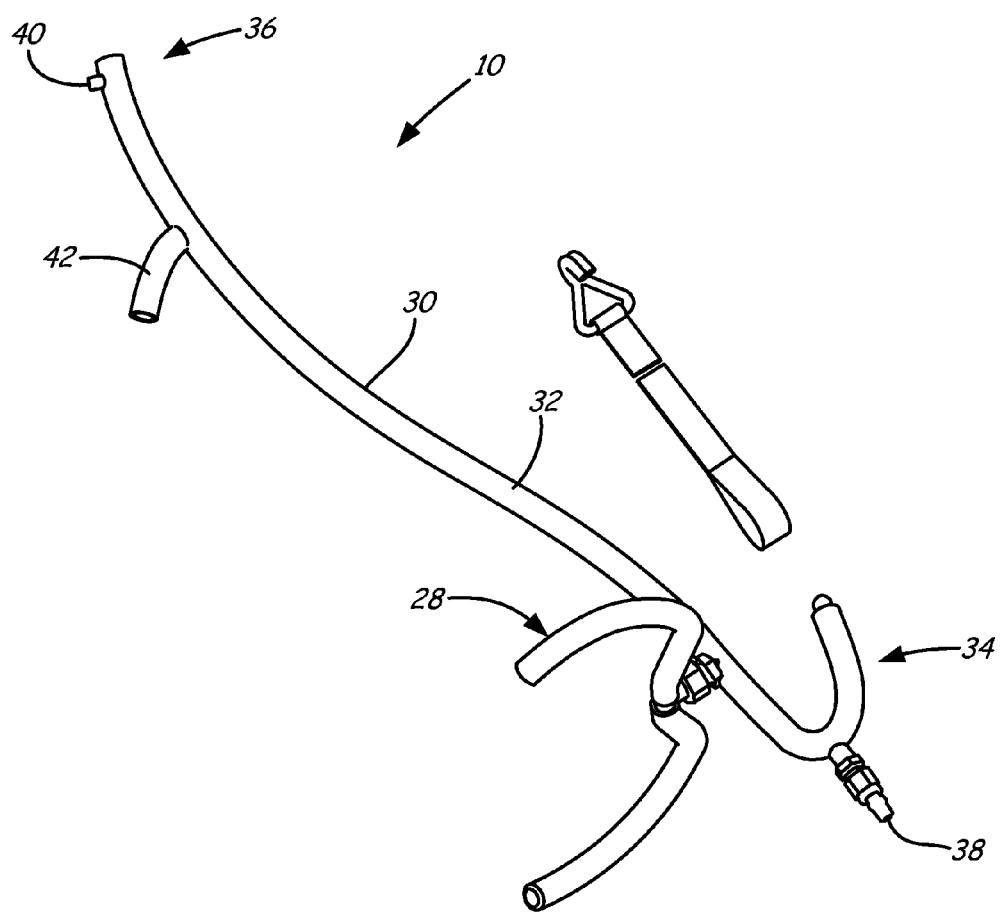
FIG. 1C shows a perspective view of the engine wash manifold of FIG. 1A.

FIG. 1A shows a perspective view of engine wash manifold 10 connected to engine 12. FIG. 1B shows a close up view of a portion of the engine wash manifold 10 and engine 12, and FIG. 1C shows a perspective view of engine wash manifold 10. Engine 12 is illustrated as a Sikorsky H-60 helicopter engine with case 14 (with outer wall 16 and inner wall 18), inlet 20, compressor inlet 22, inlet guide vanes 24 and inlet particle separator 26. Manifold 10 includes internal engine contour segment 28, wash delivery segment 30 (with pipe 32 with first end portion 34 and second end portion 36), inlet 38, nozzle 40, guide 42 and strap 44.

Manifold 10 is shaped to hold nozzle securely in place for an engine 12 wash operation. Manifold 10 can be made of metal, such as stainless steel and coated in part or in whole with a polymer type coating to prevent scratching or marring of surfaces when attaching manifold 10 to engine 12.

Internal engine contour segment 28 of manifold 10 is shaped to correspond with at least a portion of inner wall 18 of case 14 of engine 12. In the embodiment of manifold 10 shown, internal engine contour segment 28 connects to wash delivery segment 30 in the center and extends on both sides of the connection to follow the curvature of inner wall 18 of case 14 to securely stabilize manifold in a radial direction.

In the embodiment shown, nozzle 40 sprays perpendicular to second end portion 36 of pipe 32, but in other embodiments it may be oriented or directed differently. Nozzle could be a flat spray nozzle or any type of nozzle desired for the specific engine washing operation. Nozzle 40 can atomize wash liquid and can vary to direct water at different pressures, droplet sizes, temperatures and flow rates.

Wash delivery segment 30 of manifold 10 comprises pipe 32 to receive and deliver wash fluid to engine 12. Pipe 32 has first end portion 34 shaped to hook around outer wall 16 of engine 12 case 14. Pipe 32 extends perpendicular to internal engine contour segment 28, and second end portion 36 includes nozzle 40. Wash delivery segment 30 is shaped to follow the contour of inner wall 18 of engine case 14 in an axial direction so that when put in place to perform a washing operation, nozzle 40 is directed toward compressor inlet 22.

As shown in FIG. 1A, Engine wash manifold 10 connects to engine 12 by internal engine contour segment 28 connecting to inner wall 18 of case 14 at inlet 20. Wash delivery segment 30 of manifold 10 then extends perpendicular to internal engine contour segment 28, axially into engine 12. First end portion 34 of wash delivery segment wraps around case 14 to secure to outer wall 16, and second end portion 36 of wash delivery segment 30 extends to compressor inlet 22. Wash delivery segment 30 generally follows the axial contours of inner wall 18 of case 14. Nozzle 40 is held in place at compressor inlet 22 by guide 42 securing between two inlet guide vanes 24. Guide 42 ensures the nozzle 40 is properly located axially aft of inlet particle separator 26 for a washing operation. Strap 44 can connect to manifold 10 and any outer aircraft component.

To wash engine 12, manifold 10 is placed in engine 12 as shown in FIG. 1A. Internal engine contour segment 28 is placed on inner wall 18 of case 14, securing manifold 10 radially. Second end portion 36 is put into engine 12 until guide 42 rests between inlet guide vanes 24, positioning nozzle 40 aft of inlet particle separator 26 at compressor inlet 22 (see FIG. 1B). First end portion 34 is also wrapped around case 14 of engine 12, further securing manifold 10 axially. Strap 44 can connect to pipe 32 and another aircraft component, for example, the back of engine 12, to further secure manifold 10 if needed.

Once manifold 10 has been positioned with respect to engine 12, an engine washing operation can begin. Inlet 38 can receive wash liquid, which can be heated, deionized water only or could include detergent to help with the cleaning process, depending on system needs and requirements. Wash liquid can be temperature regulated for more efficient washing processes by using a heater to increase the temperature, isopropyl alcohol to keep wash liquid from freezing in cold weather or other means depending on system requirements. Wash liquid can be delivered from a hose connected to a wash unit (see FIG. 2A) or from another source. Two hoses 94 and a selector valve can allow sequential washing of a multi-engine aircraft (see FIG. 3B).

Wash liquid travels through hollow pipe 32 of wash delivery segment 30 to nozzle 40. Nozzle 40 directs the wash liquid into compressor inlet 22 to remove contaminants and buildup in compressor. During a wash operation, engine can be cranked to assist in flowing wash liquid through engine 12 in the same manner that air and contaminants flow through engine. For washing operations, it may be desirable to motor engine with starter or auxiliary power unit.

Helicopters are flown in various harsh environments where they encounter dirt, sand and a variety of other contaminants which can lead to quick soiling of the engine. To minimize contaminants entering engine 12, inlet particle separator 26 is located forward of compressor inlet 22 to prevent unwanted dirt and fluids from entering compressor inlet 22. As mentioned above, past wash systems generally introduced a low pressure (for example, 60 psi) cleaning fluid to engine inlet. This resulted in part of the cleaning fluid exiting the inlet particle separator prior to entering compressor, and thus decreasing the effectiveness of the wash spray.

Manifold 10 can effectively wash engine 12 by securing manifold 10 to engine 12 with internal engine contour segment 28 and wash delivery segment 30 so that nozzle 40 is positioned at compressor inlet 22, aft of inlet particle separator 26. This ensures that all of wash liquid delivered to inlet 38 enters compressor inlet 22 to clean engine 12. Internal engine contour segment 28 and wash delivery segment 30 are shaped to follow the contours of engine 12 case 14 to ensure manifold 10 is held securely in place during a wash operation. Guide 42 and strap 44 work to ensure further security and alignment of manifold 10. Manifold 10 can provide a successful and efficient wash for aircraft engine 12, which can increase overall engine performance by decreasing engine temperature, reducing fuel consumption, increasing engine power and improving overall engine efficiency and extending the time until the engine needs to be overhauled. A clean engine 12 can also result in fewer harmful engine 12 emissions by reducing fuel consumption while restoring efficiency, overall performance and increasing life of engine 12.

Figure 2A:
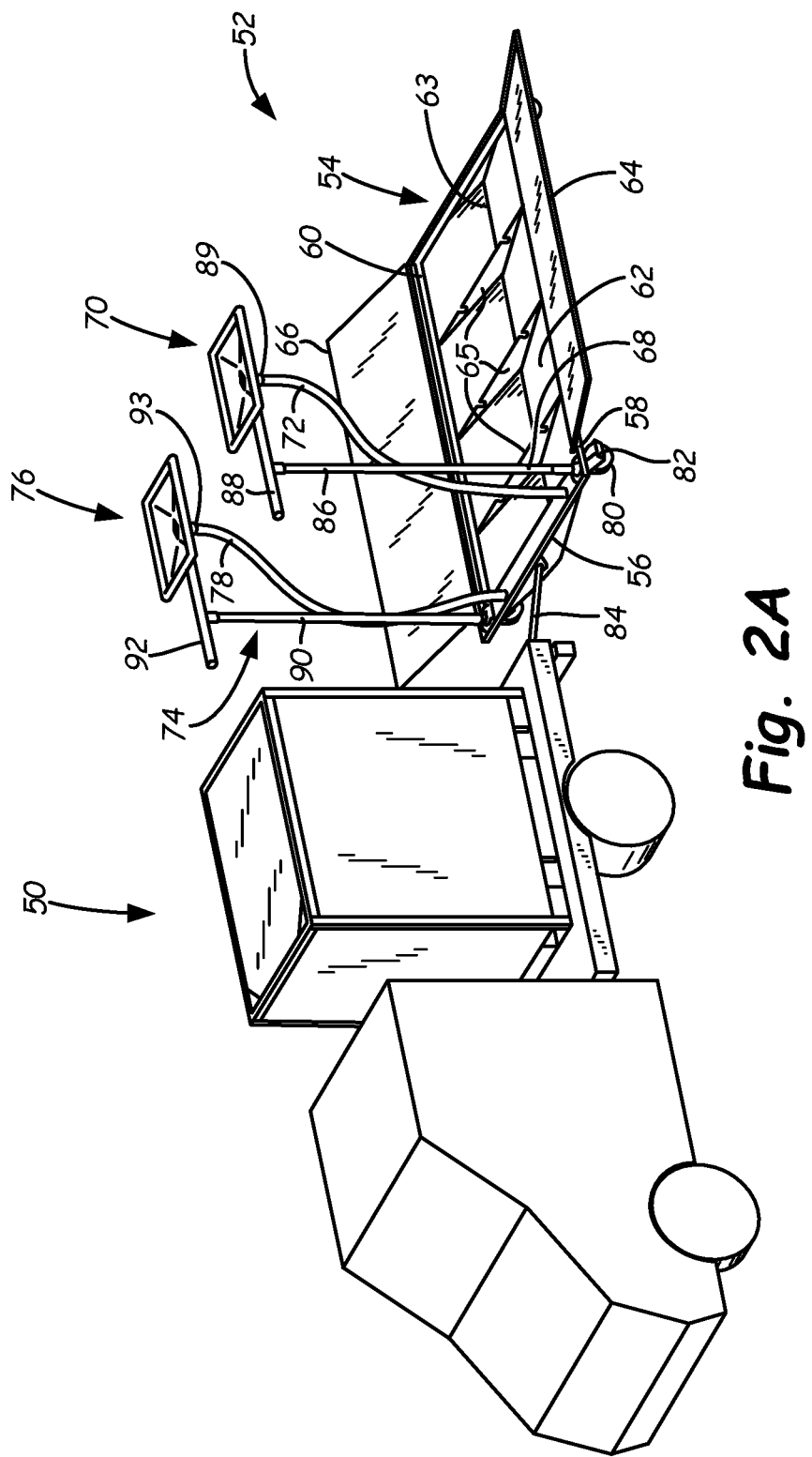
FIG. 2A shows a perspective view of an engine wash unit and a collector.
Figure 2B:
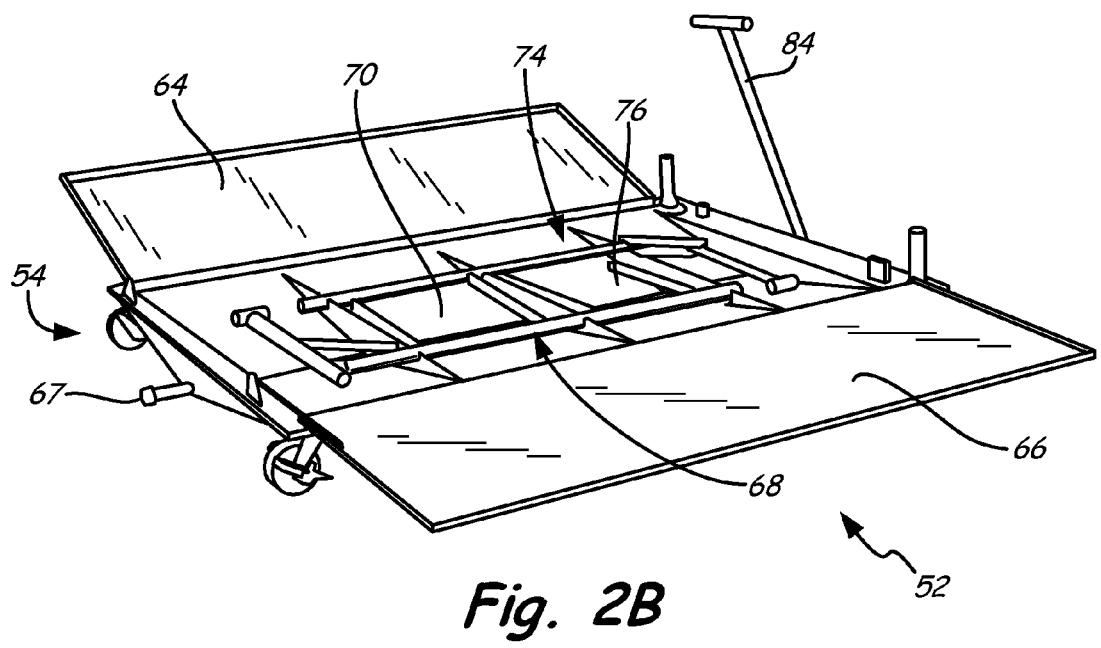
FIG. 2B shows the collector of FIG. 2A being prepared for transport or storage mode.
Figure 2C:
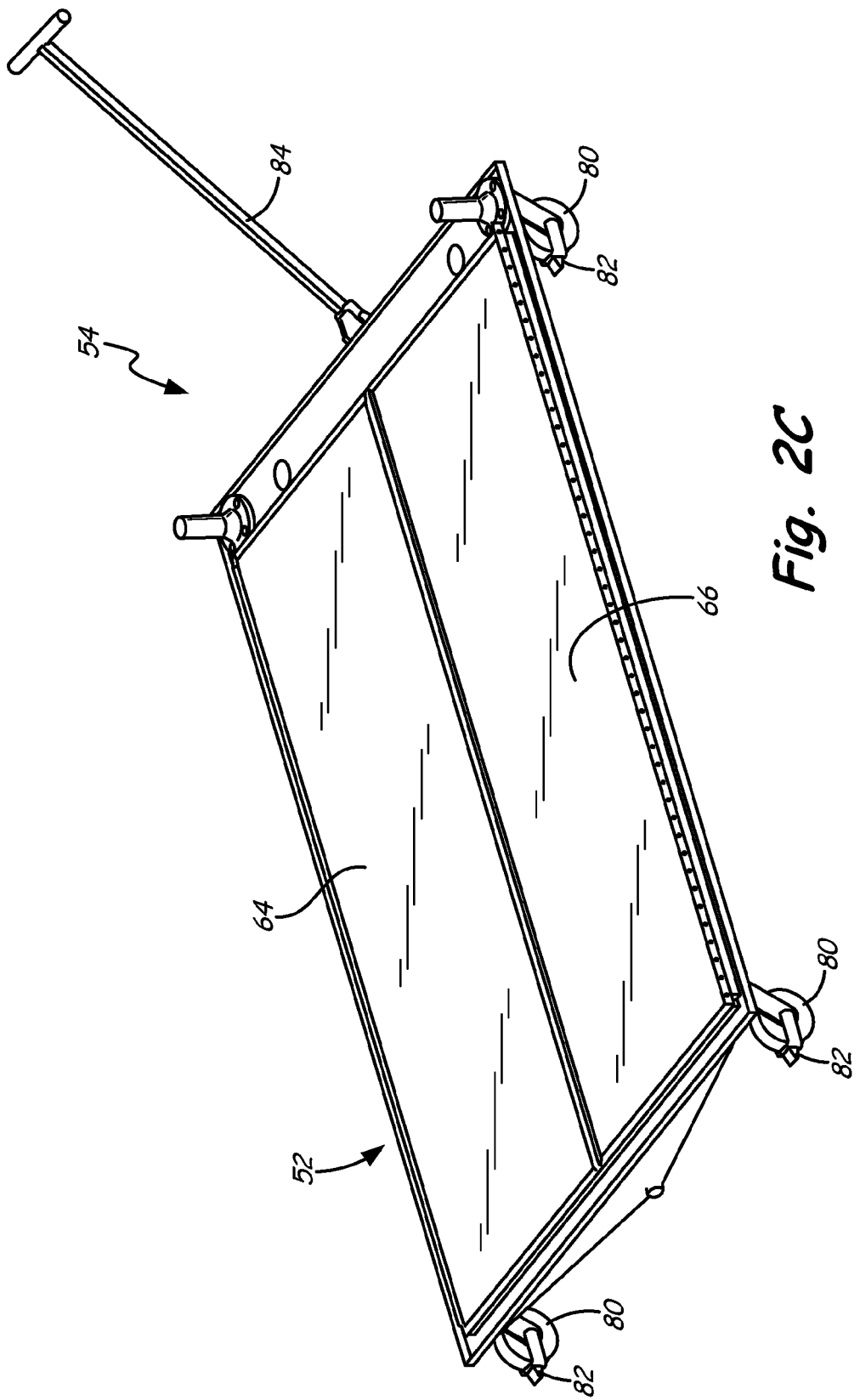
FIG. 2C shows the collector of FIG. 2A in transport or storage mode.

FIG. 2A shows a perspective view of engine wash unit 50 and collector 52, FIG. 2B shows collector 52 being prepared for transport or storage mode, and FIG. 2C shows collector 52 in transport or storage mode. Collector 52 includes collection pan 54 (with front 56, first side 58, second side 60, base 62, centerline 63, ribs 65 and outlet 67), first panel 64, second panel 66, first support 68, first funnel 70, first hose 72, second support 74, second funnel 76, second hose 78, wheels 80 with locks 82 and tow bar 84. First support 68 includes vertical support piece 86 and horizontal support piece 88. Second support 74 includes vertical support piece 90 and horizontal support piece 92.

Engine wash unit 50 can include equipment for generating power, storing, heating pumping, delivering, spraying, collecting, treating and filtering wash liquid. This can include hoses, a generator, a heater, a pump and/or the manifold shown in FIGS. 1A-1C. In the embodiment shown, engine wash unit 50 is being transported on the bed of a truck, but it could be transported in other ways, making it easy to use on land, on a ship or anywhere else that an engine would need washing.

Collection pan 54 includes a base 62 angled toward centerline 63, with ribs 65 and outlet 67 at center line 63 to drain wash fluid out of collection pan. While three ribs 65 are shown, collection pan 54 could include more or fewer ribs 65. Collection pan 54 has extendable sides with first panel 64 and second panel 66. First panel 64 is rotatably connected to first side 58 of collection pan 54, and second panel 66 is rotatably connected to second side 60 of collection pan 62. First panel 64 and second panel 66 can be rotated outward (see FIGS. 2A-2B) to increase the collection area of collection pan 54, or can be rotated inward (see FIG. 2C) for a compact configuration to enable easy transport and storage of collector 52. Tow bar 84 is connected to front 56 for easy movement of collector 52 using a vehicle (as shown) or by hand.

Vertical support piece 86 of first support 68 connects to front 56 of collection pan 54 near first side 58. Horizontal support piece 88 connects to an upper end of vertical support piece 86 and to first funnel 70 to support first funnel 70. A connection 89 between horizontal support piece 88 and funnel 70 can be a rotatable support allowing funnel 70 to rotate. First hose 72 connects to first funnel and to collection pan 54. Second funnel 76 is connected to and supported by horizontal support piece 92, which connects to vertical support piece 90. A connection 93 between horizontal support piece 92 and second funnel 76 can also be a rotatable support, allowing funnel 76 to rotate. Vertical support piece 90 of second support 74 connects to front 56 of collection pan 54 near second side 60. Second hose 78 connects to second funnel 76 and to collection pan 54. Vertical support pieces 86, 90 and horizontal support pieces 88, 92 are adjustable in the vertical and horizontal direction, for example, by using telescoping supports and/or having a slideable connection between vertical support pieces 86, 90 and horizontal support pieces 88, 92. In the embodiment shown, funnels 70, 76 are square shaped and the base is angled to drain into hoses 72, 78.

First support 68, first funnel 70, first hose 72, second support 74, second funnel 76, and second hose 78 can detach from collection pan 54 and can be placed within base 62 on ribs 65 for transport or storage, as shown in FIG. 2B. Ribs 65 can have specific notches to hold first support 68, first funnel 70, first hose 72, second support 74, second funnel 76 and/or second hose 78 in place. First panel 64 and second panel 66 can then rotate to fold over and enclose collection pan 54, as shown in FIG. 2C.

The wash fluid exiting engine 12 during a wash operation may contain contaminants requiring collection of the effluent for proper disposal or treatment. Collector acts to collect wash fluid draining from an engine wash procedure. First funnel 70 and second funnel 76 are located to collect wash fluid draining from engine cases 14 and collection pan 54 with panels 64, 66 collect wash fluid draining from the exhaust. Collection pan 54 can empty through outlet 67 into a drain through a hose (not shown) or can feed wash effluent into a system to treat the wash effluent and reclaim clean liquid for washing operations. The treatment system could be located in engine wash unit 50.

Collector 52 is an effective an efficient way to collect used wash liquid. Collector 52 is also compact and easy to transport and store by using detachable first support 68, first funnel 70, first hose 72, second support 74, second funnel 76 and second hose 78, which are able to fit inside collection pan 54 under rotatable panels 64, 66.

Figure 3A:
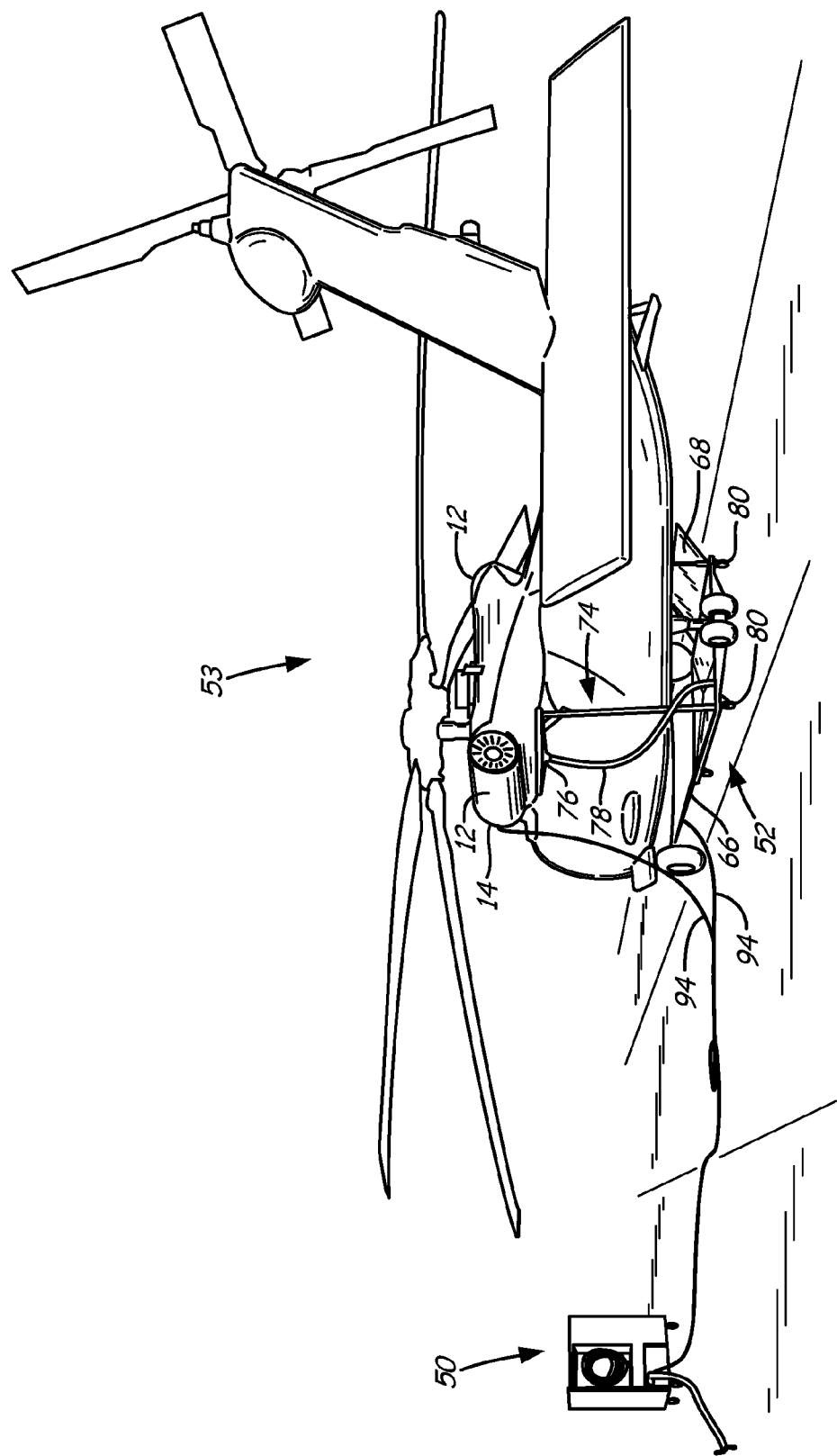
FIG. 3A shows a perspective view of a wash system using the manifold of FIGS. 1A-1C and the collector of FIGS. 2A-2C in use.
Figure 3B:
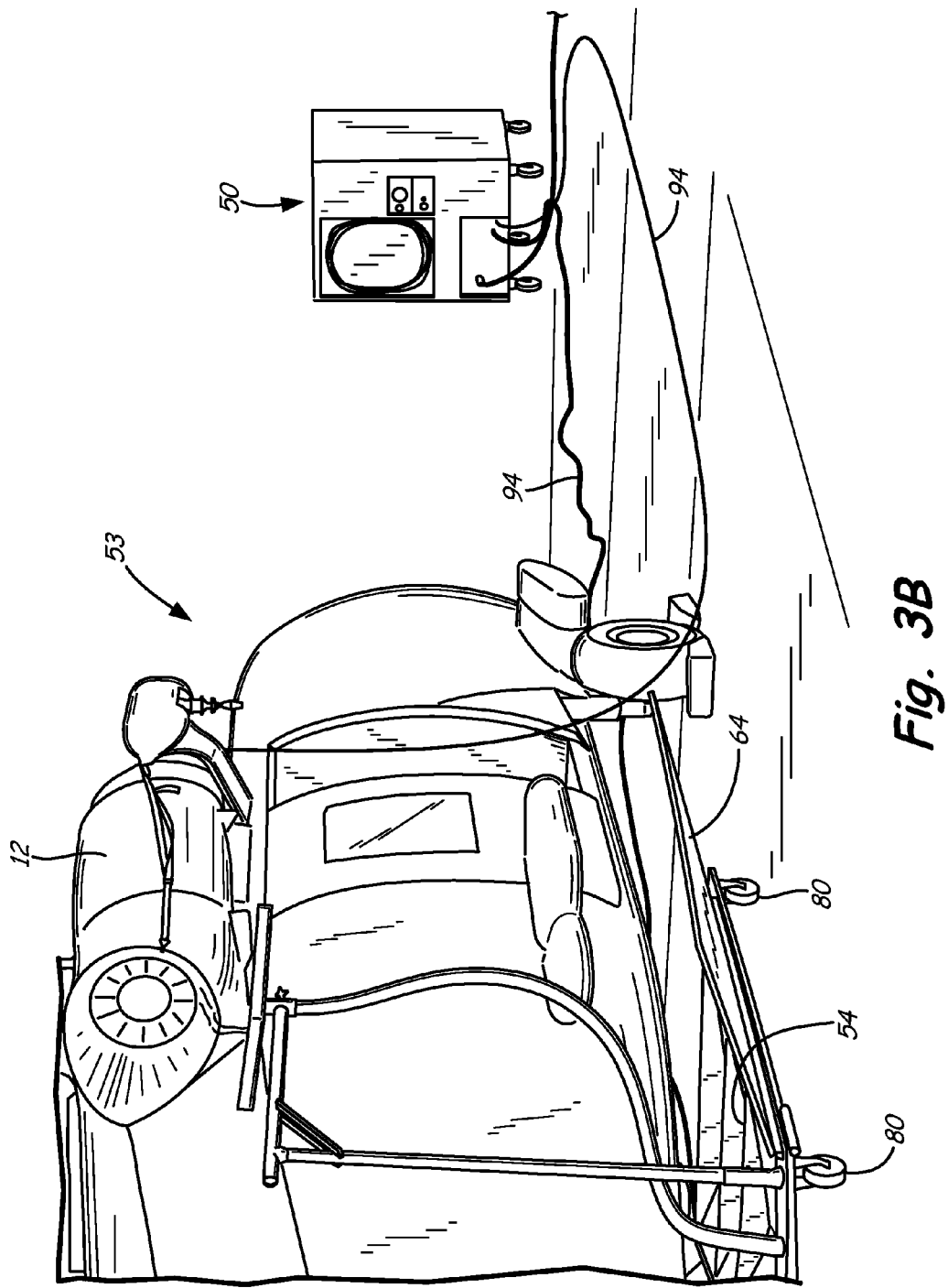
FIG. 3B shows a closer perspective view of a portion of the wash system and aircraft of FIG. 3A.
Figure 3C:
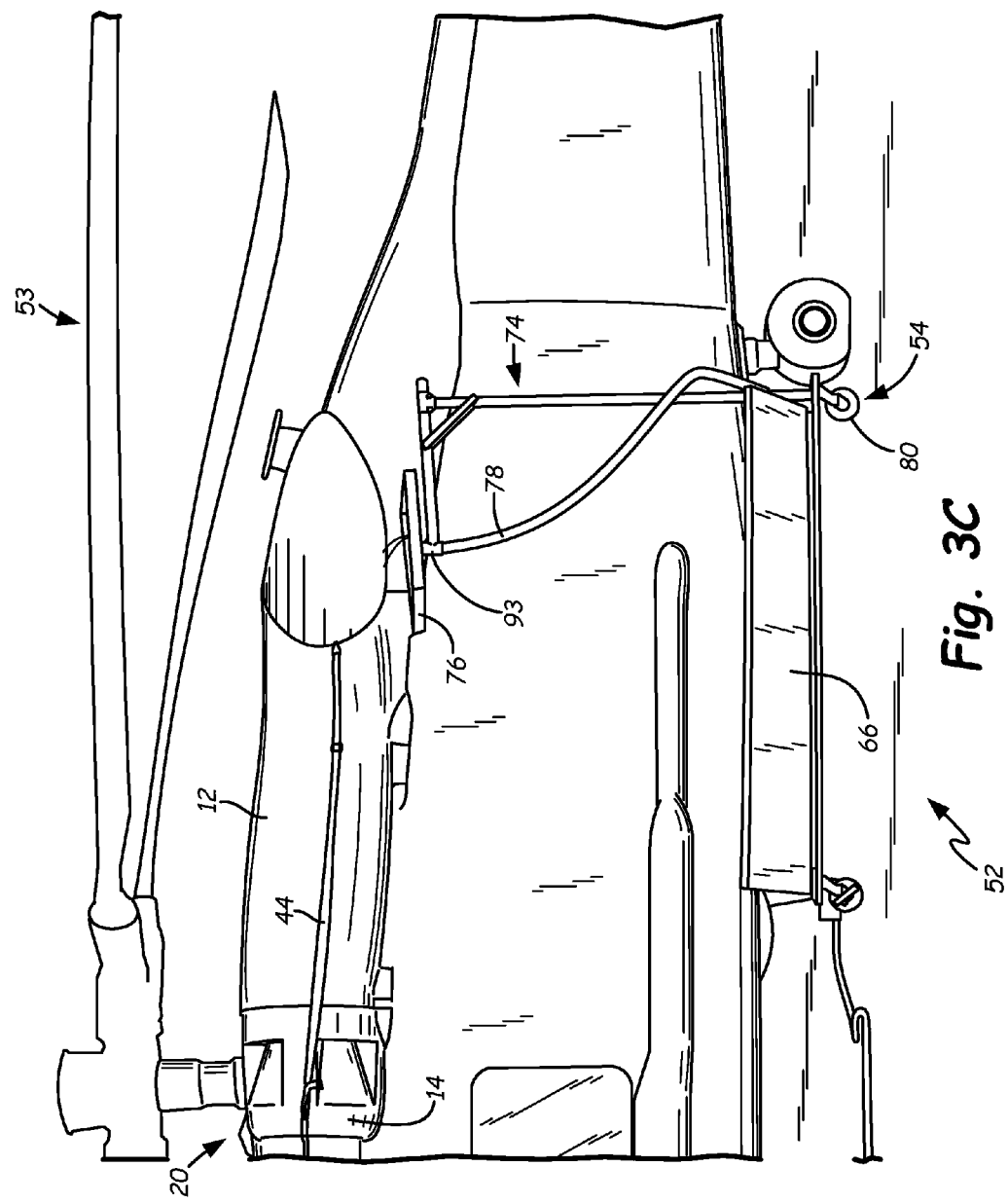
FIG. 3C shows a side view of a portion of the wash system and aircraft of FIG. 3A.

FIG. 3A shows a perspective view of wash system 100 in use with aircraft 53, FIG. 3B shows a closer perspective view of a portion of wash system 100 and aircraft 53, and FIG. 3C shows a side view of collector 52 in use with aircraft 53. FIGS. 3A-3C include aircraft 53 with engines 12, case 14 and inlet 20, engine wash unit 50, manifold 10 (with strap 44), hose 94 and collector 52 (collection pan 54, first panel 64, second panel 66, first support 68, first funnel 70, first hose 72, second support 74, second funnel 76, second hose 78 and wheels 80).

Manifold 10 can be connected to engine 12 inlet 14, as described in relation to FIGS. 1A-1C. FIG. 3C shows the connection of strap 44 to back of engine 12, providing extra support for manifold 10. Manifold 10 is connected to engine wash unit 50 through hose 94.

Collector 52 can be set up (as shown in FIG. 2A), with panels 64, 66 rotated outward and funnels 70, 76 set up with supports 68, 74 and hoses 72, 78. It can be placed relative to aircraft 53, so that collection pan 54 sits under aircraft 53 with panels 64, 66 extending to the sides of aircraft 53. This ensures that collection pan 54 and panels 64, 66 collect wash liquid coming from engine case 14 drains of aircraft 53. First funnel 70 and second funnel 76 are positioned by first adjustable support 68 and second adjustable support 74 under exhaust to collect wash effluent from engine exhaust on both engines 12 simultaneously. Wash effluent from engine exhaust flows into funnels 70, 76 and then through hoses 72, 78 to collection pan 54 where it joins wash effluent from case drains.

Wash system 100 sends wash liquid to manifolds 10 through hose 94. Manifolds 10 direct that wash liquid into compressor inlets (see FIGS. 1A-1C) to flow through engine 12. Wash liquid exits engines 12 through case 14 drains and through exhaust. This wash effluent flows to collection pan 54, both directly from case 14 drains and through funnels 70, 76 and hoses 72, 78 from exhaust. Wash effluent exits collection pan 54 at outlet 67, where it can flow back to wash unit 50 for treatment, to a drainage system and/or somewhere else for treatment and/or disposal.

Wash system 100 using manifolds 10 and collector 52 can effectively wash all engines 12 of aircraft 53 and collect wash liquid exiting engines 12 through all main exit points simultaneously, allowing for an efficient and effective wash procedure. Manifolds 10 effectively introduce wash liquid into engine to clean engine by spraying aft of inlet particle separator, therefore ensuring a more effective wash. Collector 52 collects all streams of wash effluent by using collection pan 54 with panels 64, 66 and funnels 70, 76, allowing for collection from both aircraft engines 12 simultaneously, and therefore allowing both engines to be washed at the same time. Collector 52 is also collapsible, allowing for easy transport and storage due to its compact configuration with all components detachable and able to fit inside collection pan 54. Wash system 100 provides a robust and effect wash system for H-60 aircraft 53, that can be a closed loop system (with wash unit 50), which can wash engine 12, collect the used wash liquid, and remove contaminants from the used wash liquid to prepare it for reuse in washing operations. Engine wash system 100 is compact and portable, allowing for use wherever needed.

The use of a Sikorsky H-60 helicopter engine is for example purposes only, and engine wash manifold 10 and/or collector 52 can be used with other aircrafts and/or engines.

While collector 52 has been shown to use funnels 70, 76 with supports 68, 74 and hoses 72, 78, alternate embodiments could include flexible ducts and/or hoses directly connecting places where wash effluent would exit to collection pan 10.

An engine wash system includes a collector for collecting wash liquid from an engine washing operation. The collector includes a collection pan with a base angled toward a centerline and first and second panels rotatably connecting to first and second sides of the collection pan; a plurality of wheels connecting to the base; a first support connecting on a lower end to the collection pan and extending vertically upward from the collection pan; a first funnel connecting to the first support; and a first hose connecting the first funnel to the collection pan.

Additional and/or alternative embodiments include a second support connecting on a lower end to the collection pan and extending vertically upward from the collection pan, a second funnel connecting to the second support, and a second hose connecting the second funnel to the collection pan; the first support being connected at a front end and near the first side of the collection pan; the second support being connected at a front end and near the second side of the collection pan; the first support, the first funnel and the first hose being able to disconnect from the collection pan and can be placed inside the collection pan; the first support, the first funnel, the first hose, the second support, the second funnel and the second hose being able to disconnect from the collection pan, be placed inside the collection pan and the first and second sides can rotate to cover the collection pan with the first support, the first funnel, the first hose, the second support, the second funnel and the second hose inside; the collection pan further comprising one or more wheel locks for preventing movement of the collection pan; the collector further comprising a tow bar; the first support and the second support each comprising a first adjustable support extending vertically from the collection pan; a second adjustable support extending horizontally from the first adjustable support and connecting to the first funnel; and a third rotatable support which allows the funnel to rotate; a mobile cart for moving the collection pan; a manifold for securing to the engine to wash the first engine; the manifold comprising a internal engine contour segment shaped to correspond with at least a portion of the engine case at the inlet to stabilize the manifold in a radial direction; a wash delivery segment connected to the internal engine contour segment, the wash delivery segment comprising a pipe shaped to follow the engine case curvature in an axial direction with a first end portion to hook around an outside of the engine case at the inlet, a second end portion to sit inside the engine case; an inlet on the wash delivery segment to receive wash fluid; a nozzle on the second end portion of the wash delivery portion directed to spray into the compressor inlet of the engine when the first end is hooked around the outside of the engine; and a guide extending from the pipe and shaped to align the manifold with respect to the engine so that the nozzle sprays into the engine aft of the inlet particle separator; a strap to connect to the first end of the wash delivery segment and to an external engine component; a wash unit to deliver the wash fluid to the manifold inlet and to receive the wash effluent from the collector; and/or the wash unit being able the wash effluent for reuse.

A collector for collecting wash effluent from an engine includes a collection pan with a base angled toward a centerline, ribs and extendable sides; a first vertically extending collection apparatus connectable to the collection pan; and a second vertically extending collection apparatus connectable to the collection pan.

Additional and/or alternative embodiments include the first and second vertically extending collection apparatus each comprising a support connecting on a lower end to the collection pan and extending vertically upward from the collection pan, a funnel connecting to the first support, and a hose connecting the first funnel to the collection pan; the extendable sides comprising a first rotatable panel connecting to a first side of the collection pan; and a second rotatable panel connecting to a second side of the collection pan; and/or the first support, the first funnel, the first hose, the second support, the second funnel and the second hose being able to disconnect from the collection pan, be placed inside the collection pan and the first and second panel can rotate to cover the collection pan with the first support, the first funnel, the first hose, the second support, the second funnel and the second hose inside.

A method for collecting wash effluent from an engine washing operation includes providing a collector with a collection pan with rotatable panels connected to first and second sides of the pan and first and second funnels detachably connected to the collection pan; placing the collector relative to an aircraft so that the collection pan and panels are located beneath engine case outlets and the first and second funnels are located beneath engine exhaust outlets; and collecting wash effluent draining from the engine in the collector. Additional and/or alternative embodiments include transferring the wash effluent from the collector to a wash unit for treatment.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An engine wash system with a collector for collecting wash effluent from an engine washing operation, the collector comprising:
    a collection pan with a base angled toward a centerline and first and second panels rotatably connecting to first and second sides of the collection pan;
    a plurality of wheels connecting to the base;
    a first support connecting on a lower end to the collection pan and extending vertically upward from the collection pan;
    a first funnel connecting to the first support, wherein the first funnel is arranged with an open face oriented vertically upward, and wherein the first funnel is vertically spaced above the collection pan in a deployed position; and
    a first hose connecting the first funnel to the collection pan.

2. The engine wash system of claim 1, and further comprising:
    a second support connecting on a lower end to the collection pan and extending vertically upward from the collection pan;
    a second funnel connecting to the second support; and
    a second hose connecting the second funnel to the collection pan.

3. The engine wash system of claim 2, wherein the first support is connected at a front end and near the first side of the collection pan.

4. The engine wash system of claim 3, wherein the second support is connected at a front end and near the second side of the collection pan.

5. The engine wash system of claim 1, wherein the first support, the first funnel and the first hose can disconnect from the collection pan and can be placed inside the collection pan.

6. The engine wash system of claim 2, wherein the first support, the first funnel, the first hose, the second support, the second funnel and the second hose can disconnect from the collection pan, be placed inside the collection pan and the first and second panels can rotate to cover the collection pan with the first support, the first funnel, the first hose, the second support, the second funnel and the second hose inside.

7. The engine wash system of claim 1, wherein the collection pan further comprises:
    one or more wheel locks for preventing movement of the collection pan.

8. The engine wash system of claim 1, wherein the collector further comprises:
    a tow bar.

9. The engine wash system of claim 1, wherein the first support comprises:
    a first adjustable support extending vertically from the collection pan;
    a second adjustable support extending horizontally from the first adjustable support and connecting to the first funnel; and
    a third rotatable support which allows the funnel to rotate.

10. The engine wash system of claim 1, and further comprising
    a manifold for securing to an engine to wash the engine; and
    a wash unit to deliver the wash fluid to a manifold inlet and to receive the wash effluent from the collector.

11. The engine wash system of claim 10, wherein the manifold comprises:
    an internal engine contour segment shaped to correspond with at least a portion of an engine case at an inlet of the engine to stabilize the manifold in a radial direction;
    a wash delivery segment connected to the internal engine contour segment, the wash delivery segment comprising a pipe shaped to follow the engine case curvature in an axial direction with a first end portion to hook around an outside of the engine case at the inlet, a second end portion to sit inside the engine case;
    an inlet on the wash delivery segment to receive wash fluid;
    a nozzle on the second end portion of the wash delivery portion directed to spray into the compressor inlet of the engine when the first end is hooked around the outside of the engine; and
    a guide extending from the pipe and shaped to align the manifold with respect to the engine so that the nozzle sprays into the engine aft of an inlet particle separator.

12. The engine wash system of claim 11, and further comprising:
    a strap to connect to the first end of the wash delivery segment and to an external engine component.

13. The engine wash system of claim 11, wherein the wash unit treats the wash effluent for reuse.

14. The engine wash system of claim 2, wherein the second funnel is vertically spaced from the collection pan in a deployed position.

15. The engine wash system of claim 1, wherein in the deployed position the first funnel is positioned to directly collect the wash effluent draining from an engine case, wherein at least one of the collection pan and the first and second panels is positioned to directly collect the wash effluent draining from an engine exhaust outlet, and wherein the first funnel and the first hose are configured to redirect the wash effluent to the collection pan.

* * * * *